3,318,767
BIOCIDAL COMPOSITIONS CONTAINING 4,5-DICYANO-1,3-DITHIOLE-2-THIONE OXIDE

Erwin Klingsberg, Mountainside, N.J., assignor to American Cyanamid Company, Stamford, Conn., a corporation of Maine
No Drawing. Original application June 26, 1963, Ser. No. 290,635, now Patent No. 3,214,442, dated Oct. 26, 1965. Divided and this application Aug. 26, 1965, Ser. No. 482,894
3 Claims. (Cl. 167—33)

This application is a divisional of a copending application for Letters Patent, Ser. No. 290,635, filed on June 26, 1963, now U.S. Patent 3,214,442.

The present invention relates to a novel heterosulfur compound and to a method for its preparation. More particularly, the invention relates to the preparation of 4,5-dicyano-1,3-dithiole-2-thione oxide and to fungitoxic compositions containing the latter thione oxide as the active ingredient. Still more particularly, the invention is concerned with methods for protecting agricultural organic and related articles from attack by microorganisms.

Heretofore, fungicidal compositions containing sulfur compounds as the active ingredient have been prepared. These, however, have not been wholly satisfactory, since many do not possess the ability to destroy fungi as well as inhibit fungi spore germination and control bacteria growth. It is, therefore, an object of the present invention to prepare a sulfur compound useful in a fungicidal composition which overcomes the prior art drawbacks.

To this end, it has been unexpectedly found that 4,5-dicyano-1,3-dithiole-2-thione oxide having the formula:

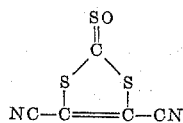

can be readily prepared and incorporated into a composition possessing unusual fungicidal and bactericidal properties. These compositions are particularly effective in preventing and retarding fungus growth on plant tissues and other organic matter.

According to the present invention, the compound is prepared by the oxidation of 4,5-dicyano-1,3-dithiole-2-thione. The oxidation procedure takes place in an inert organic solvent, such as acetone, utilizing peracids such as, for instance, peracetic acid or perbonzoic acid. For example, an acetone solution containing 4,5-dicyano-1,3-dithiole-2-thione is treated for fifteen minutes with peracetic acid dissolved in acetone. Upon filtration, a red solid material decomposing at 182° C. is obtained. The compound is readily crystallizable from dioxane or butyl acetate and analyzes as follows:

Calculated for $C_5ON_2S_3$: C, 30; N, 14.0; $S_3$, 48. Found: C, 29.9; N, 14.2; $S_3$, 48.

In general, it is preferred to incorporate the thione oxide as defined above in a variety of suitable carriers or diluents. Advantageously, the fungicidal compound is effective in extremely dilute concentrations. In this respect, less than 0.01 percent is employed to obtain 100 percent kill of bacteria or fungi. The compositions can be prepared as a solution by dissolving the compound in a water/acetone or alcohol mixture. Suitable compositions can also be prepared either as a suspension in a non-solvent, or as a dust. Suspensions or dispersions of the thione oxide in a carrier, such as water, are useful in the treatment of plant foliage. If desired, the fungicidal compound can be conveniently applied to foliage by dissolving the compound in a highly volatile liquid carrier, such as dichlorodifluoromethane, maintained under pressure. Alternatively, the active compound can be dissolved in a less volatile solvent, such as benzene, and the solution can be further admixed with a highly volatile liquid carrier under ambient pressures.

For some applications, dusts may be required. These can be prepared by mixing the active compounds with materials such as clay, fuller's earth, bentonite and punice. In this manner, seed can be protected from soil microorganisms by incorporating the active compound in a solid carrier, while tumbling seeds with the composition.

As stated above, it is critical that less than 0.01 percent of fungicide compound be present in the inert carrier. For most purposes, a range of from 0.001 percent to 0.005 percent is entirely satisfactory.

Advantageously, the compositions of the present invention may include compatible commercially available dispersing agents for the compound, particularly when it is employed in an aqueous suspension. Illustrative of such dispersing or surface-active agents are the fatty acid esters of polyhydric alcohol, the sodium salt of polymerized propyl naphthalene, sulfonic acid and the ethylene oxide condensates of alkylaryl polyether alcohols. It is a good practice to employ from one to five parts per one-hundred parts of fungicide.

The following examples are presented merely by way of illustration and are not to be taken as limitative of the invention. All parts are by weight, unless otherwise stated.

Example 1

The in vitro fungitoxicity of 4,5-dicyano-1,3-dithiole-2-thione oxide as prepared above (hereinafter known as T.O.) is determined using a standard spore germination technique. Test fungi are *Monolinia fructigena* and *Stemphylium sacrcinaeforme*.

A standardized spore suspension of each fungus is placed in a 50% acetone/water solution containing the compound: T.O. in a graded concentration series. Germination percentages are recorded after twenty-four hours of incubation at 75° F. and 100% relative humidity. The results in terms of concentration necessary to inhibit germination of the spores are tabulated in Table I below.

TABLE I

| Percent Concentration (T.O.) | Percent Inhibition of Fungus Spores in 24 Hours | |
|---|---|---|
| | *Monolinia fructigena* | *Stemphylium sarcinaeforme* |
| 0.01 | 100 | 100 |
| 0.001 | 100 | 100 |
| 0.0001 | 0 | 0 |

Example 2

The compound: T.O. is tested against two fungus diseases: anthracnose of cucumber and late blight of tomato, which is caused by the fungi *Colletotrichum lagenarium* and *Phytophthora infestans*, respectively.

In these tests, four cucumber plants (Green Profilic) and five tomato plants (variety Richared) are transplanted as seedlings into 6" x 10" jiffy flats. They are interspersed in each flat and when grown to the state of two true leaves, they are ready for test use. The compound: T.O. is prepared as a 500 p.p.m. and a 100 p.p.m. suspension in a 50/50 acetone/water mixture. Sixty (60) parts of the compound are placed in 60 parts by volume of acetone and 60 parts by volume of water. This constitutes a 500 p.p.m. suspension. Twenty (20) parts by volume of this solution are then added to 80 parts of 50/50 acetone and water diluent. This yields a 100 p.p.m. suspension.

An inoculum containing equal amounts, namely about 50,000 spores per milliliter of freshly cultured colletotrichum which is cultured on potato dextrose agar, and Phytophthora cultured on sterilized wheat seed, is next prepared.

Two of the 6" x 10" jiffy flats as previously prepared are employed as controls and are sprayed with the 50/50 acetone and water solution. Two flats are additionally sprayed with a 100 p.p.m. solution of the active compound in 50/50 acetone and water and two additional flats are sprayed with a 500 p.p.m. solution of the compound. When the flats are dried, the mixed inoculum as previously prepared is applied to the flats sprayed with solutions of the active compounds. The so-treated flats are maintained along with the control at 65° F. and 100% relative humidity to permit the invasion of leaf tissue by fungi organisms for thirty-six to forty-eight hours. Thereafter, the flats are transferred from the relative humidity chamber to the atmosphere and given regular care until the disease causes lesions on the foliage.

It is observed that where the flats have been treated with 100 p.p.m. solutions of the active compound, the infested plants are completely healthy. However, the flats treated with the 500 p.p.m. solution show herbicidal activity. Therefore, 100 p.p.m. concentration should not be exceeded, since a concentration of 100 p.p.m. gives complete control of the fungi infestation.

*Example 3*

To each of three test tubes are added 9 parts of deionized water. The tubes are next closely capped and autoclaved. When sterile and cool, 1 part by volume of a 1000 p.p.m. solution of the compound: T.O. is pipetted eseptically into each tube so as to yield 100 p.p.m. concentration of the compound in the tube.

One drop of a twenty-four hour broth culture of *Aerobacter aerogens*, a gram-negative rod bacterium, is added to each tube. The tubes are maintained at room temperature for twenty-four hours. A broth comprising 10% peptone and 1% dextrose is prepared and 1.1 parts of the latter are added to each tube. Aseptic conditions are maintained during the latter addition. The tubes are incubated at 30° C. for twenty-four hours and then observed. All tubes lacking turbidity are then subcultured to clean peptone dextrose broth and the subcultures are incubated for an additional forty-eight hours at 30° C. Any subculture lacking turbidity are reported as kill of the organism at the test concentration and the results are tabulated in Table II, below.

TABLE II

| Percent Concentration (T.O.) | *Percent Kill of Aerobacter aerogens* |
|---|---|
| 0.01 (100 p.p.m.) | 100 |
| 0.001 (10 p.p.m.) | 0 |

*Example 4*

Repeating Example 2 in every respect, except that a wettable powder is employed in lieu of the acetone/water solution, the wettable powder is formulated as a mixture of 70 parts by weight of the compound: T.O., 22 parts of clay, 5 parts of silica, 1 part of carboxymethylcellulose and 2 parts of alkylaryl polyether alcohol-ethylene oxide condensate, and thereafter milling the blended mixture to an average particle size of 1.5 microns. The wettable powder is next incorporated into water to form a 70% aqueous solution and is applied to a host plant previously inoculated following the procedure of Example 2 above. The results are recorded in Table III below.

TABLE III

| Treatment | Rate Actual, p.p.m. | Cucumber Anthracnose | |
|---|---|---|---|
| | | No. of Lesions [1] | Percent Disease |
| T.O. wettable powder in 70% aqueous solution | 500 | 0 | 0 |
| | 100 | 18 | 4 |
| Water Control | ---------- | 450 | 100 |
| Acetone/Water Control | ---------- | 710 | 100 |

[1] The total number of anthracnose lesions on the primary leaves of 8 replicates cucumber plants per treatment.

What is claimed is:

1. A biocidal composition consisting essentially of an inert biocidal carrier and an effective amount of 4,5-dicyano-1,3-dithiole-2-thione oxide.

2. A process for the control of fungi which comprises the steps of: applying to a locus containing fungi a fungicidal composition consisting essentially of an inert fungicidal carrier and an effective amount of 4,5-dicyano-1,3-dithiole-2-thione oxide; and, thereafter, effecting substantial control of said fungi.

3. A process for the control of bacteria which comprises the steps of: applying to a locus containing bacteria an antimicrobial composition consisting essentially of an inert carrier and an effective amount of 4,5-dicyano-1,3-dithiole-2-thione oxide; and, thereafter, effecting control of said bacteria.

No references cited.

LEWIS GOTTS, *Primary Examiner.*

S. K. ROSE, *Assistant Examiner.*